US009537966B2

(12) United States Patent
Liu

(10) Patent No.: US 9,537,966 B2
(45) Date of Patent: Jan. 3, 2017

(54) SYSTEMS AND METHODS FOR LOCATION BASED DATA PUSHING

(71) Applicant: Tencent Technology (Shenzhen) Company Limited, Shenzhen (CN)

(72) Inventor: Jing Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 368 days.

(21) Appl. No.: 14/245,970

(22) Filed: Apr. 4, 2014

(65) Prior Publication Data

US 2014/0358994 A1 Dec. 4, 2014

Related U.S. Application Data

(63) Continuation of application No. PCT/CN2014/070092, filed on Jan. 3, 2014.

(30) Foreign Application Priority Data

May 31, 2013 (CN) .......................... 2013 1 0213408
May 31, 2013 (CN) .......................... 2013 1 0213421

(51) Int. Cl.
*H04L 29/08* (2006.01)
*G06F 17/30* (2006.01)
(Continued)

(52) U.S. Cl.
CPC ......... *H04L 67/26* (2013.01); *G06F 17/30899* (2013.01); *H04L 67/02* (2013.01);
(Continued)

(58) Field of Classification Search
CPC .......... H04L 67/26; H04L 67/22; H04L 67/02; H04L 67/18; H04W 4/023; H04W 4/206
(Continued)

(56) References Cited

U.S. PATENT DOCUMENTS 8,583,621 B2 * 11/2013 Bennett ............. G06F 17/30241
707/706
8,924,526 B1 * 12/2014 Levy ..................... G06F 9/5055
709/223
(Continued)

FOREIGN PATENT DOCUMENTS

CA          2372808 A1 * 11/2000  ....... G06F 17/30241
CN        103037007 A      4/2013
WO   WO 2008024972 A2 *  2/2008  ............. G06Q 30/00

OTHER PUBLICATIONS

Tencent Technology, ISRWO, PCT/CN2014/070092, Mar. 27, 2014, 7 pgs.
(Continued)

*Primary Examiner* — Kostas Katsikis
(74) *Attorney, Agent, or Firm* — Morgan, Lewis & Bockius LLP

(57) ABSTRACT

In accordance with a method for location based data pushing, a computer server receives first geolocation data that identify a first geolocation of a first client device, and identifies a plurality of second client devices as located within a predetermined range of the first geolocation. In response to the identifying, the computer server retrieves webpage log data that record information concerning a plurality of websites that have been accessed by the second client devices. Further, in response to a web access request received from the first client device for accessing a webpage, the computer server identifies, among the retrieved webpage log data, one or more web pages as being related to the webpage associated with the web access request, and transmits information of at least one identified webpage and the webpage associated with the web access request to the first client device.

19 Claims, 8 Drawing Sheets

(51) Int. Cl.
*H04W 4/02* (2009.01)
*H04W 4/20* (2009.01)

(52) U.S. Cl.
CPC .............. *H04L 67/18* (2013.01); *H04L 67/22* (2013.01); *H04W 4/023* (2013.01); *H04W 4/206* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 8,982,220 | B2* | 3/2015 | Schultz | H04N 5/23206 |
| | | | | 348/207.1 |
| 9,098,477 | B2* | 8/2015 | Joel | G06F 17/2264 |
| 9,183,319 | B2* | 11/2015 | Joel | G06F 17/30905 |
| 9,277,365 | B1* | 3/2016 | Wilden | H04W 4/028 |
| 2002/0132616 | A1* | 9/2002 | Ross | H04M 1/05 |
| | | | | 455/419 |
| 2007/0127555 | A1* | 6/2007 | Lynch | G06F 17/3087 |
| | | | | 375/142 |
| 2010/0121718 | A1* | 5/2010 | AlanDietz | G06F 17/30893 |
| | | | | 705/14.58 |
| 2010/0198812 | A1* | 8/2010 | Athsani | G06F 17/30867 |
| | | | | 707/722 |
| 2012/0185370 | A1* | 7/2012 | Davie | G06Q 30/04 |
| | | | | 705/34 |
| 2012/0290950 | A1* | 11/2012 | Rapaport | H04L 51/32 |
| | | | | 715/753 |
| 2013/0073389 | A1* | 3/2013 | Heath | G06Q 50/01 |
| | | | | 705/14.54 |
| 2013/0104035 | A1 | 4/2013 | Wagner et al. | |
| 2013/0151988 | A1* | 6/2013 | Sorin | H04L 65/403 |
| | | | | 715/753 |
| 2013/0198275 | A1* | 8/2013 | Forsblom | G06Q 50/01 |
| | | | | 709/204 |
| 2013/0325964 | A1* | 12/2013 | Berberat | H04L 67/18 |
| | | | | 709/204 |
| 2014/0115042 | A1* | 4/2014 | Yin | H04L 65/403 |
| | | | | 709/203 |

OTHER PUBLICATIONS

Tencent Technology, IPRP, PCT/CN2014/070092, Dec. 1, 2015, 5 pgs.

* cited by examiner

SYSTEMS AND METHODS FOR LOCATION BASED DATA PUSHING

RELATED APPLICATIONS

This application is a continuation application of PCT Patent Application No. PCT/CN2014/070092, entitled "SYSTEMS AND METHODS FOR LOCATION BASED DATA PUSHING" filed Jan. 3, 2014, which claims priority to Chinese Patent Application Nos. 201310213421.8, entitled "METHOD, APPARATUS AND SYSTEM FOR WEBPAGE PUSH AND RECEIVING WEBPAGE PUSH," filed May 31, 2013, and 201310213408.2, entitled "METHOD FOR PUSHING MEDIA FILE, METHOD, APPARATUS AND SYSTEM FOR RECEIVING MEDIA FILE," filed May 31, 2013, all of which are incorporated by reference in their entirety.

FIELD OF THE INVENTION

The present application relates to the field of data communication technology, and in particular, to methods, systems and devices for determining content of a webpage that is transmitted to a client device in response to a web access request issued by the client device.

BACKGROUND OF THE INVENTION

Push and Pull technologies are widely applied to communicate data between a web browser and a web server in a standard webpage request and response process. Pull technology allows the web browser at a client side to initiate a webpage access request and collect specific content data concerning a corresponding webpage. However, Push technology has become a more popular solution of Internet-based communication where the web server is able to proactively provide collated content that is personalized for the user of the web browser without the user specifically requesting the personalized content. The personalized content provided by the web server is often determined by preference settings that are set forth in advance in the web browser by the user. As a result, Push technology has conveniently allowed the user to select content in a requested webpage according to his or her personal preferences, and thereby satisfied the user's unique demands in a customized manner.

Typically, in Push technology, a server computer normally tracks websites visited by a specific client device, studies user behaviors of a user based on a track record of the visited websites, and determines content of a webpage according to the user behaviors in response to a webpage access request received from the same client device. Thus, the pushed content of the requested webpage is merely indicative of the user's own behaviors and interests, and is substantially limited in its scope. There is a need to develop push technology that proactively predicts user preferences beyond the existing scope of user's own behaviors and thus provides webpage content to anticipate the user's potential interests and ultimately improve corresponding user experience.

SUMMARY

The above deficiencies and other problems associated with the conventional approaches of pushing webpage content to a web browser on a client device are reduced or eliminated by the invention disclosed below. In some embodiments, the invention is implemented in a server computer that has one or more processors, memory and one or more modules, programs or sets of instructions stored in the memory for performing multiple functions. Instructions for performing these functions may be included in a computer program product configured for execution by one or more processors.

One aspect of the invention is a computer-implemented method for location based data pushing. The method includes, at server computer having one or more processors and memory for storing programs to be executed by the one or more processors, receiving from a first client device first geolocation data that identify a first geographical location (geolocation) of the first client device. The method further includes identifying a plurality of second client devices according to respective second geolocation data received from each of the plurality of second client devices, wherein each second client device is identified as located within a predetermined range of the first geolocation; and in response to the identifying, retrieving webpage log data that record information concerning a plurality of websites that have been accessed by the plurality of second client devices. The method further includes in response to a web access request received from the first client device for accessing a webpage: identifying, among the retrieved webpage log data, one or more web pages as being related to the webpage associated with the web access request; and transmitting information of at least one identified webpage and the webpage associated with the web access request to the first client device.

Another aspect of the invention is a server computer that includes one or more processors and memory having instructions stored thereon, which when executed by the one or more processors cause the processors to perform operations to receive from a first client device first geolocation data that identify a first geolocation of the first client device. The processors in the client device further perform operations to identify a plurality of second client devices according to respective second geolocation data received from each of the plurality of second client devices, wherein each second client device is identified as located within a predetermined range of the first geolocation; and in response to the identifying, retrieve webpage log data that records information concerning a plurality of websites that have been accessed by the plurality of second client devices. The processors in the client device further perform operations to in response to a web access request received from the first client device for accessing a webpage: identify, among the retrieved webpage log data, one or more web pages as being related to the webpage associated with the web access request; and transmit information of at least one identified webpage and the webpage associated with the web access request to the first client device.

Another aspect of the invention is another computer-implemented method for location based data pushing. The method includes, at server computer having one or more processors and memory for storing programs to be executed by the one or more processors, receiving from a first client device first geolocation data that identify a first geolocation of the first client device. The method further includes identifying a plurality of second client devices according to respective second geolocation data received from each of the plurality of second client devices, wherein each second client device is identified as located within a predetermined range of the first geolocation; and in response to the identifying, retrieving webpage log data that record information concerning a plurality of websites that have been accessed by the plurality of second client devices. The method further includes customizing content of a specific webpage according to one or more web pages that are related to the specific webpage and included in the retrieved webpage log data, and in response to a web access request received from the first client device for accessing a webpage, transmitting the specific webpage that includes the customized content to the first client device.

Another aspect of the invention is a non-transitory computer-readable medium, having instructions stored thereon, which when executed by one or more processors cause the processors to perform operations to receive from a first client device first geolocation data that identify a first geolocation of the first client device. The processors in the client device further perform operations to identify a plurality of second client devices according to respective second geolocation data received from each of the plurality of second client devices, wherein each second client device is identified as located within a predetermined range of the first geolocation; and in response to the identifying, retrieve webpage log data that records information concerning a plurality of websites that have been accessed by the plurality of second client devices. The processors in the client device further perform operations to customize content of a specific webpage according to one or more web pages that are related to the specific webpage and included in the retrieved webpage log data, and in response to a web access request received from the first client device for accessing a webpage, transmit the specific webpage that includes the customized content to the first client device.

Other embodiments and advantages may be apparent to those skilled in the art in light of the descriptions and drawings in this specification.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Figure 1:
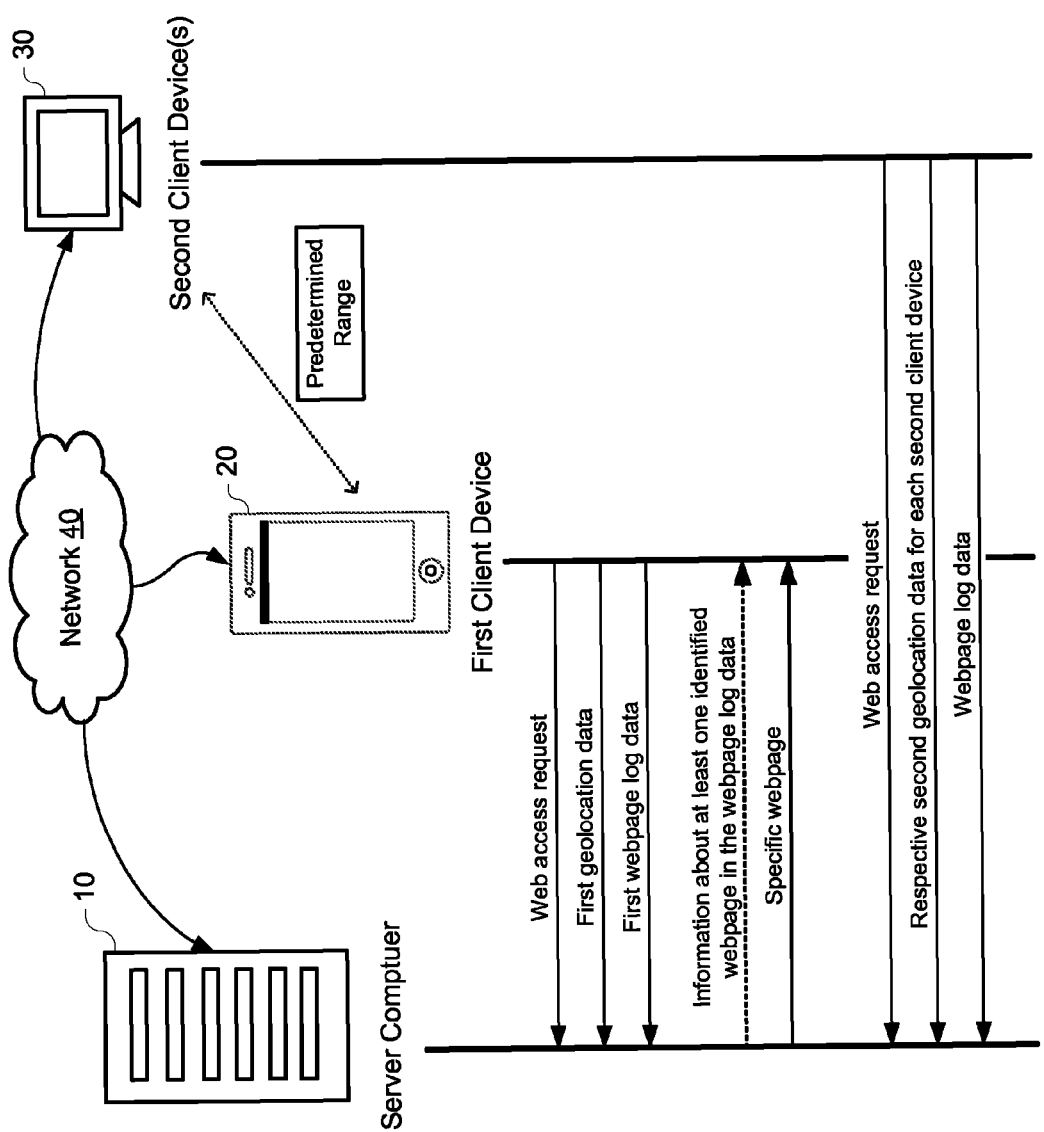
FIG. 1 illustrates exemplary data communication processes implemented in a data communication system according to some embodiments in the invention.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Description of each embodiment in the following is made with reference to the accompanying drawings, so as to exemplify specific embodiments capable of being implemented in the present application. Direction words mentioned in the present application, for example, "upper", "lower", "front", "back", "left", "right", "inner", "outer", and "side surface" only refer to directions of the accompanying drawings. Therefore, the used direction words are used to illustrate and understand the present application, instead of limiting the present application. In the drawings, units with a similar structure may be represented by the same numeral.

FIG. 1 illustrates exemplary data communication processes 100 implemented in a data communication system according to some embodiments in the invention. The data communication system includes server computer 10 and a plurality of client devices, including first client device 20 and one or more second client devices 30. Server computer 10, first client device 20 and second client devices 30 are communicatively coupled to each other via communication network 40. In accordance with data communication processes 100, server computer 10 responds to a web access request by pushing data, e.g., information concerning a location, webpage log data, and content of a webpage, to first client device 20 based on relative geographical locations (geolocations) between the first and second client devices.

In various embodiments of the invention, communication network 40 that support communication among server computer 10, first client device 20 and second client devices 30 can be one or more networks having one or more type of topologies including but not limited to the Internet, intranets, local area networks (LANs), cellular networks, Ethernet, Storage Area Networks (SANs), telephone networks, Bluetooth personal area networks (PAN) and the like. In some embodiments, first client device 20 is coupled to server computer 10 via a wired connection, while second client devices 30 are coupled to server computer 10 via LANs.

In various embodiments of the invention, server computer 10 can receive a web access request, first geolocation data and first webpage log data from first client device 20. The web access request is issued by first client device 20 to request an access to a specific webpage that is hosted and controlled by server computer 10. The first webpage log data track information concerning a plurality of websites that have been accessed by first client device 20. The first geolocation data identify at least a first geographical location (geolocation) of first client device 20. In some embodiment, the first geolocation data includes current geolocation data associated with a current geolocation where first client device 20 is currently located, while in some embodiments the first geolocation data includes historical geolocation data that track where first client device 20 was previously located during a predetermined duration of time. Thus, the first geolocation is optionally the current geolocation or one of the previous geolocation of first client device 20.

In some circumstances, the web access request, the first geolocation data and the first webpage log data are communicated from first client device 20 to server computer 10 together in one communication session; however, in other circumstances, they are communicated to server computer 10 independently in different communication sessions. In one specific example, the web access request is sent by first client device 20 as needed, independently of the first geolocation data and the first webpage log data. On the other hand, the webpage log data are sent when new web pages are loaded at first client devices 20, and the first geolocation data are regularly updated to server computer 10. Under some circumstances, first client device 20 merely provides and updates its webpage log data and geolocation data to server computer 10, when first client device 20 issues a new web access request for accessing the corresponding webpage supported by server computer 10.

Similarly, in various embodiments of the invention, server computer 10 can also receive a respective web access request, respective second geolocation data and respective webpage log data from each of client device 30. The respective web access request is issued to request an access to a specific webpage, and the respective webpage log data record information concerning a plurality of websites that have been accessed by each second client device 30. The respective geolocation data received from each of second client devices 30 further include current geolocation data that identify where respective second client device 30 is currently located, and historical geolocation data that identify where respective second client device 30 was previously located during a predetermined duration of time.

Additionally, the respective web access request, respective second geolocation data and respective webpage log data are also optionally communicated from second client device 30 to server computer together in one communication session or separately in different communication sessions. Similarly, in one specific example, the respective web access request is sent by second client device 30 as needed, and the respective webpage log data are sent when new web pages are loaded at second client devices 30, while the respective second geolocation data are regularly updated to server computer 10. Under some circumstances, second client device 30 provided and updated its webpage log data and geolocation data to server computer 10, when second client device 30 previously sent a web access request for accessing the corresponding webpage supported by server computer 10.

In some embodiments, first client device 20 and each second client device 30 independently manages issuing of their respective web access requests, and updating of their respective geolocation and webpage log data. In some embodiments, server computer 10 manages updating of the respective geolocation and webpage log data in a centralized manner.

In some implementations, in response to the web access request received from first client device 20, server computer 10 returns to first client device 20 at least one identified webpage in the webpage log data received from second client devices 30, and a requested specific webpage. Upon receiving such information, first client device 20 may customize the requested specific webpage to take into account behaviors and interests of users of second client devices 30 based on the at least one identified webpage in the webpage log data received from second client devices 30. In particular, second client devices 30 are selected based on their second geolocation data in view of the first geolocation of first client device 20.

It is noted that the first geolocation functions as a reference location to identify second client devices 30. In some situations, the first geolocation is where first client device 20 is currently located, while in other situations, the first geolocation is where first client device 20 was previously located at a previous instant. The respective second geolocation data optionally identify a current location or a previous location of corresponding second client device 230. Second client devices 30 are identified when the current or previous location of second client device 30 is or was located within a predetermined range of the first geolocation of first client device 20. Accordingly, the requested specific webpage is customized according to the webpage log data of the selected second client devices 30.

From another perspective, users of second client devices 30 constitute a small group of interested users who share a common activity region with the user of first client device 20. This is so because second client devices 30 are presently located nearby the current location of first client device 20, previously located nearby the current location of first client device 20, currently located nearby a previous location that first client device 20 once visited, or previously located nearby a previous location that first client device 20 once visited.

In some implementations, the user of first client device 20 optionally determines first criteria for selecting the first geolocation (or the reference location) and second criteria for identifying second client devices 30 in a user interface of a web browser installed on first client device 20. However, in some implementations, server computer 10 proactively determines both criteria for first client device 20, and thereafter, analyzes the received geolocation data and webpage log data based on the determined criteria.

As discussed in the Background, many existing solutions adopt a webpage push technique that is merely based on the first client device's own web browsing activities. In contrast, various embodiments in the invention take advantage of feedback from other client devices located within a certain physical range of a request client device. Thus, content of the specific webpage delivered to the request device is richer, and more relevant to the user's demand.

Figure 2A:
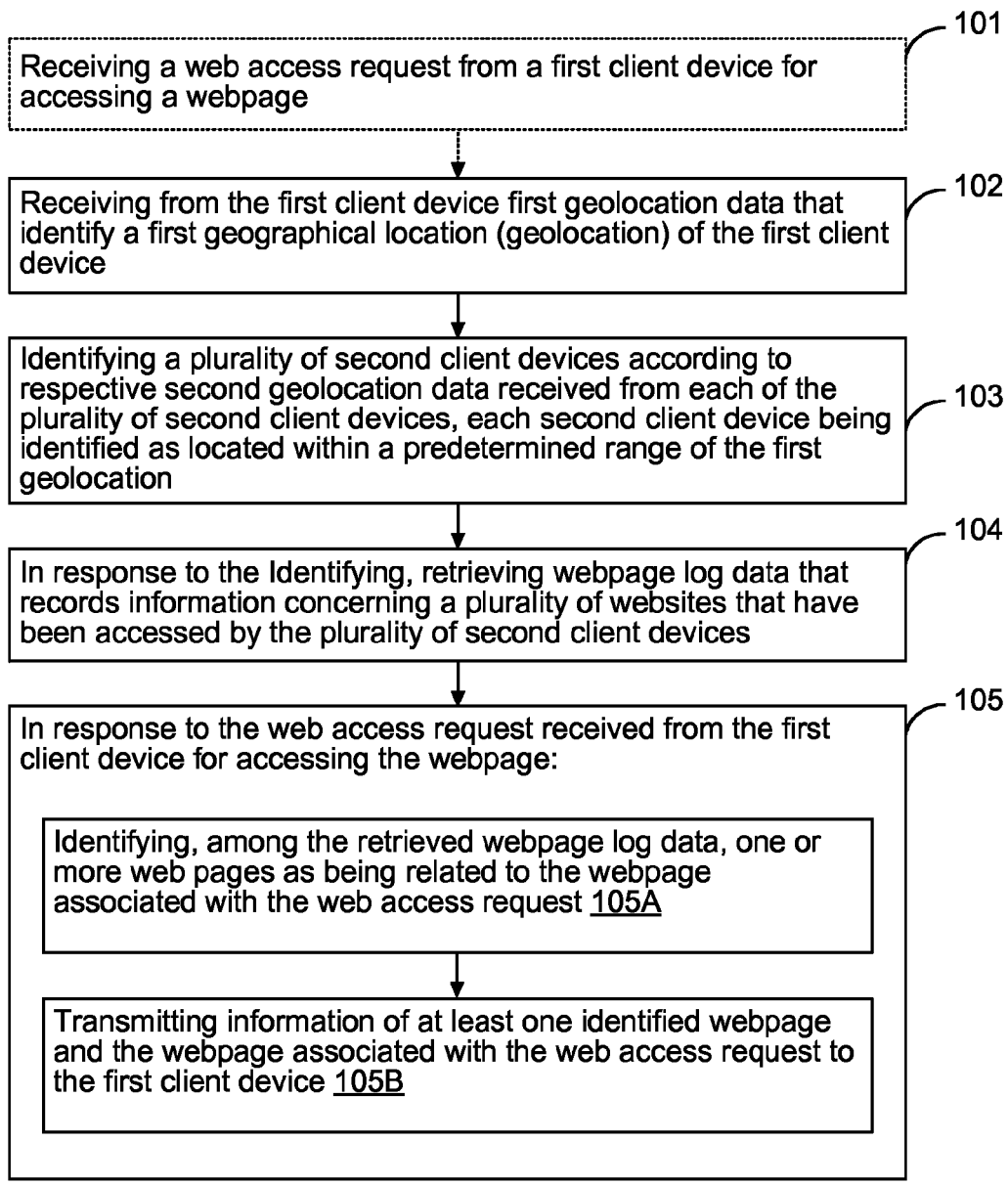
FIG. 2A illustrates a flow chart for an exemplary method that is implemented at a server computer to push location based data according to some embodiments in the invention.

FIG. 2A illustrates a flow chart for an exemplary method 200 that is implemented at a server computer to push location based data according to some embodiments in the invention. In particular, method 200 is performed to provide location based webpage content to first client device 20 that requests a specific webpage from server computer 10. Method 200 is, optionally, governed by instructions that are stored in a non-transitory computer readable storage medium and that are executed by one or more processors of a client device. Each of the operations shown in FIG. 2A may correspond to programs or instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

Method 200 includes receiving (101) a web access request from first client device 20 for accessing a webpage. In addition, server computer 10 receives (102) from first client device 20 first geolocation data that identify at least a first geographical location (geolocation) of first client device 20. In accordance with the first geolocation of first client device 20, server computer 10 further identifies (103) a plurality of second client devices according to respective second geolocation data received from each of the plurality of second client devices. Each identified second client device is identified as located within a predetermined range of the first geolocation of first client device 20.

Each client device is optionally a personal computer that is fixed at a venue, or a mobile client device (e.g., a notebook computer, a mobile phone and a tablet computer) that is carried by a user of the corresponding client device. Optionally, first and second geolocation data include the respective latitude, longitude and elevation for the first and second client devices, respectively. Optionally, first and second geolocation data include Internet Protocol (IP) addresses of the first and second client devices, respectively. In some implementations, when the first or second client devices are mobile devices, they could rely on an embedded Location Based Service (LBS) (e.g., a Global Position System (GPS) function) to obtain their respective geolocation data. In one example, the respective geolocations of a client device are identified as its relative position with respect to base stations in a cellular network. In other implementations, server computer 10 determines the geolocation of first client device 20 based on the corresponding IP address of the first client device 20.

In some implementations, the predetermined range within which second client devices 30 are identified with respect to the first geolocation of first client device 20 is defined by default. However, in other implementations, the predetermined range is modified to a preferred range by a user of first client device 20 so as to cover a venue where the user of first client device 20 is currently or was previously located. In some specific examples, the predetermined range is set as a distance of 100 meters, 500 meters or 1 kilometer. In some embodiments, the predetermined range covers a venue that is selected from a group consisting of a school, a store, a company site, a library, a hotel and a residence.

In some implementations, the predetermined range with respect to the first geolocation is set at a relatively large value, and covers a wide area surrounding this first geolocation where first client device 20 is currently or was previously located. Thus, second client devices 30 can be selected according to the venues where their users visited or are currently located, even when such venues are not close to the first geolocation. As one specific example, first and second geolocation data indicate that first and second client devices 30 are associated together by two correlated venues which have similar functions, such as two high schools and two store or restaurant franchises.

In response to the identifying (103), server computer 10 further retrieves (104) webpage log data that records information concerning a plurality of websites that have been accessed by second client devices 30. When each client device (e.g., first client device 20 and second client device 30) requests an access to a specific website online, a corresponding webpage is provided by a certain resource server (e.g., server computer 10) via communication network 40. In many embodiments, the respective client device requests the access to the specific website by inputting a corresponding Uniform Resource Locator (URL) address. Upon receiving or browsing the webpage, the respective client device updates a browsing record of the requested web pages to include corresponding webpage log data (e.g., the URL address). In some embodiments, a web browser in the respective client device stores the webpage log data locally, such that the browsed webpage may be reloaded quickly based on the stored webpage log data in response to another web access request to the same website. Thus, in some embodiments, the webpage log data for each second client device 30 include URL addresses and information concerning content of each of the websites that have been accessed by second client devices 30 during a predetermined duration of time.

In some embodiments, content of a webpage includes text, images, audio clips, video clips, and web feeds. In accordance with the webpage content, the information concerning the content of the webpage content includes, but is not limited to, textual information, hyperlinks, feed information, and many other types of related information. In some embodiments, the information concerning the content further includes information about corresponding behavior patterns and interests of a user of the respective client device, which are derived based on the specific websites that are accessed by the user.

After retrieving the webpage log data, server computer 10 responds (105) to the web access request received from first client device 20 by identifying (105A), among the retrieved webpage log data, one or more web pages as being related to the webpage associated with the web access request; and transmitting (105B) information of at least one identified webpage and the webpage associated with the web access request to the first client device. Then, when first client device 20 receives the information of the at least one identified webpage and the requested webpage, first client device 20 determines content for the requested webpage based on the information of at least one identified webpage that is originally included in the webpage data log of one or more second client devices 30. Therefore, by setting a proper designated range, server computer 10 enables client devices that are located at the first geolocation or visited nearby locations to share their webpage log data, and customizes the webpage content for one of these client devices according to the browsing habits of the users of the other client devices.

In many implementations, the customized content of the requested webpage is selected from images, product information, sales, sales tips, news posts, stock quotes, and advertisements. In some specific examples, users located within a predetermined range of the first geolocation of first client device 20 are mainly high school students sharing similar interests and tastes in clothing, books and media content. When first client device 20 requests to access a shopping website, server computer 10 sponsored by the shopping website therefore delivers webpage log data of one or more nearby second client device 30 together with the requested webpage. The requested webpage is customized accordingly to arrange presentation of products or highlight some popular merchandise. In other specific examples, advertisements loaded together with the requested webpage are selected according to the behavior patterns and interests of other users that are located at the first geolocation or visited nearby locations, and thereby present more trendy and customer-oriented product information to the user of the corresponding client device.

It should be understood that the particular order in which the operations in FIG. 2A have been described are merely exemplary and are not intended to indicate that the described order is the only order in which the operations could be performed. Specifically, operation 101 of receiving the web access request may be implemented before or after any of operations 102-104, except that it has to be completed before operation 15 which responds to the web access request. Additionally, it should be noted that details of other processes described herein with respect to methods 250, 300, 400 and 500 (e.g., FIGS. 2B, 3, 4 and 5) are also applicable in an analogous manner to method 200 described above with respect to FIG. 2A. For brevity, these details are not repeated here.

Figure 2B:
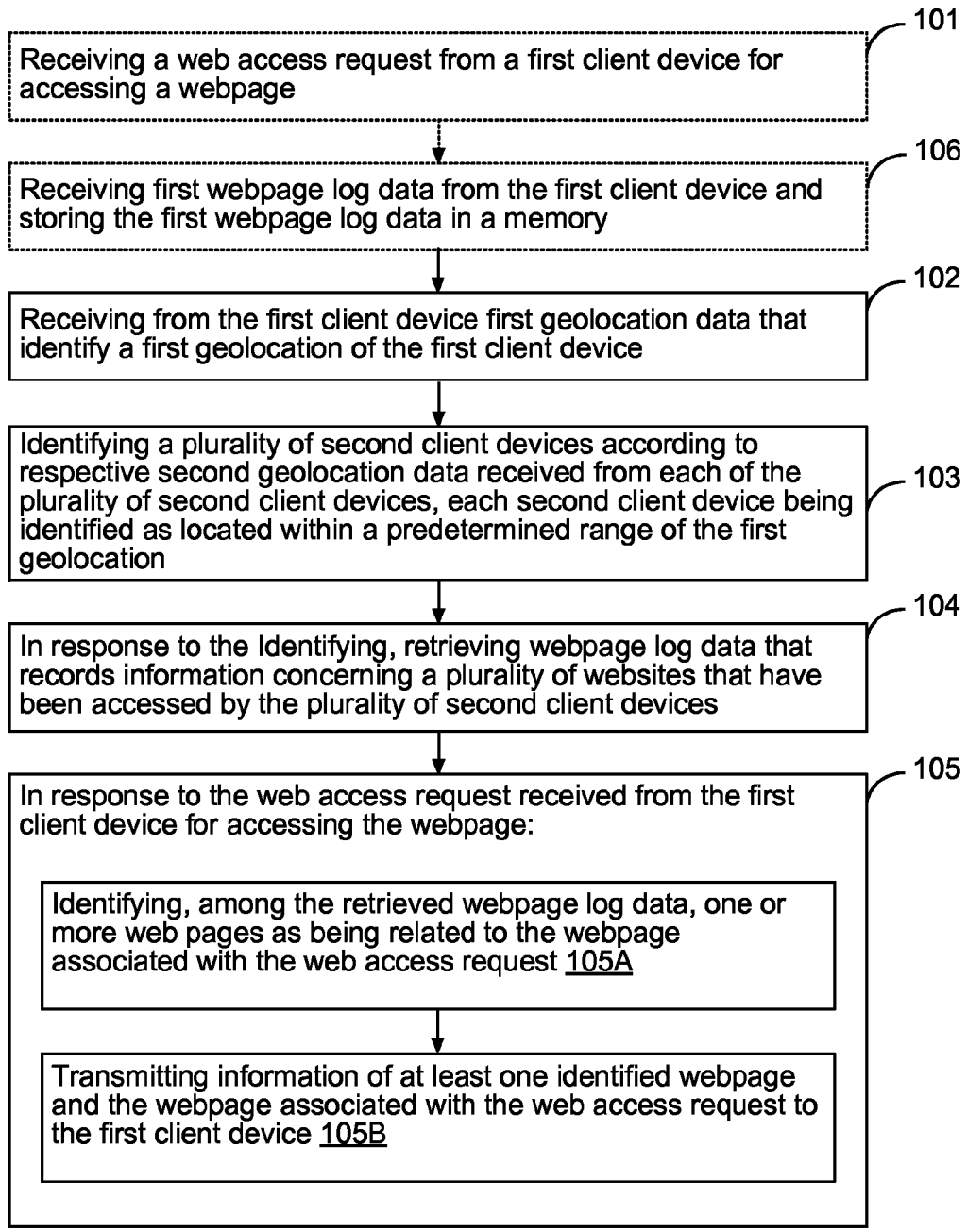
FIG. 2B illustrates a flow chart for another exemplary method that is implemented at a server computer to push location based data according to some embodiments in the invention.

FIG. 2B illustrates a flow chart for another exemplary method 250 that is implemented at a server computer to push location based data according to some embodiments in the invention. Here, method 250 is also performed to provide location based webpage content to first client device 20 that requests a specific webpage from server computer 10. On basis of method 200, in addition to operations 101-105, server computer 10 also receives (106) first webpage log data from first client device 20 and stores (106) the first webpage log data in the memory.

It should be understood that the particular order in which the operations in FIG. 2B have been described are merely exemplary and are not intended to indicate that the described order is the only order in which the operations could be performed. Therefore, in various embodiments, operation 106 of receiving and storing the first webpage log data may be implemented according to a different order of the sequence of operations in method 250. In some implementations, the first webpage log data are received from first client device 20 when the web access request is received from first client device 20, just as the webpage log data for second client devices 30 were previously received and stored in the memory of server computer 10, when server computer 10 received respective web access requests issued by corresponding second client devices 30. In some implementations, the first webpage log data are received from first client device 20 when the first geolocation data are received from first client device 20. The first webpage log data are therefore stored on server computer 10, and may be used to respond to a web access request from another client device based on location based data pushing as described herein for first client device 20.

In some implementations, server computer 10 tracks and updates the first geolocation data, the respective geolocation data received from each second client device 30, the first webpage location data, and the webpage log data for second client devices 30, before first client device 20 sends the web access request. In some implements, such tracking and updating operations are maintained regularly at a specific frequency (e.g., every one hour) to keep track of all or some selected client devices associated with server computer 10. However, in some implementations, such tracking and updating operations for a certain client device occur when server computer 10 receives from the client device a web access request.

Figure 3:
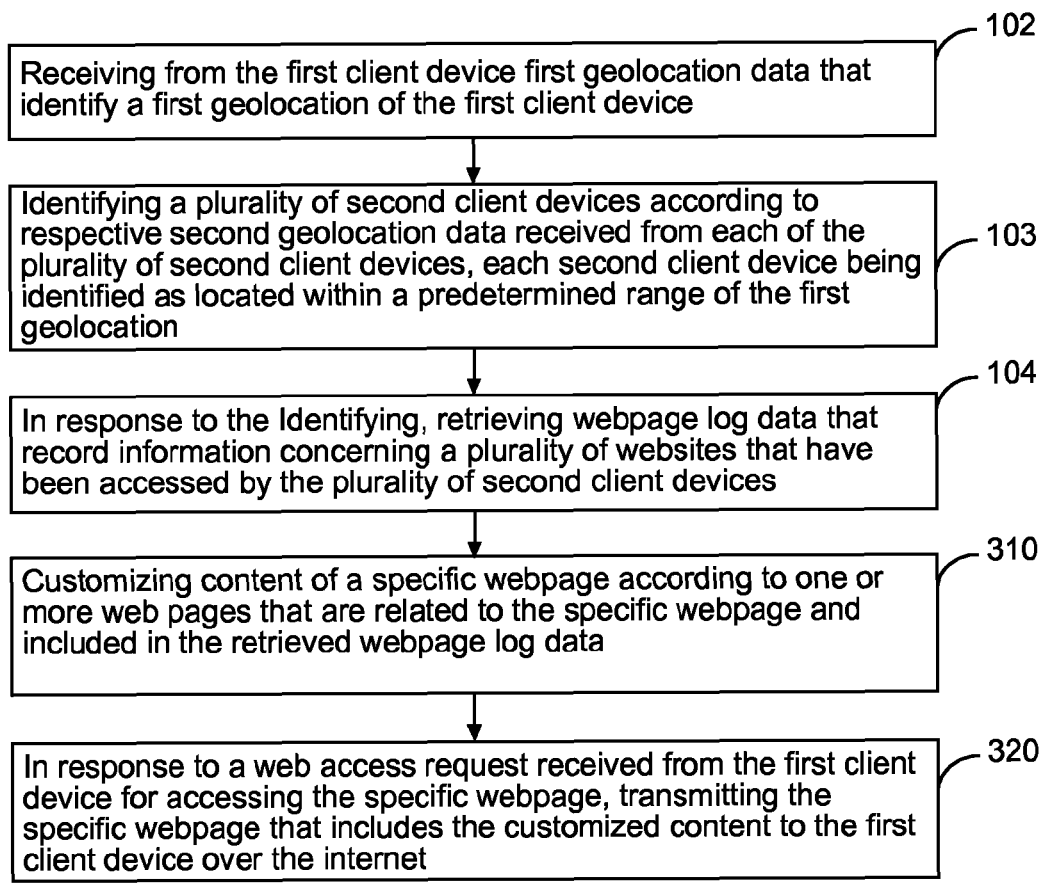
FIG. 3 illustrates a flow chart for an exemplary method that is implemented at a server computer to push location based webpage content to a client device according to some embodiments in the invention.

FIG. 3 illustrates a flow chart for an exemplary method that is implemented at a server computer to push location based webpage content to a client device according to some embodiments in the invention. Method 300 is performed to provide location based webpage content to first client device 20 that requests a specific webpage from server computer 10. Unlike methods 200 and 250, method 300 relies on server computer 10 to customize content of the specific webpage requested by first client device 20 based on webpage log data for second client devices 30. The raw data in the webpage log data received from second client devices 30 are retained at said server computer without being leaked to the other client devices.

Method 300 is, optionally, governed by instructions that are stored in a non-transitory computer readable storage medium and that are executed by one or more processors of a client device. Each of the operations shown in FIG. 3 may correspond to programs or instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

In method 300, server computer 10 receives (102) from first client device 20 first geolocation data that identify at least a first geolocation of first client device 20. Server computer 10 then identifies (103) a plurality of second client devices 30 according to respective second geolocation data received from each second client device, and each of such identified second client devices 30 is identified as previously or currently located within a predetermined range of the first geolocation of first client device 20. In response to the identifying, server computer 10 retrieves (104) webpage log data that record information concerning a plurality of websites that have been accessed by the plurality of second client devices 30. Server computer 10 further customizes (310) content of a specific webpage according to one or more web pages that are related to the specific webpage and included in the retrieved webpage log data. Then, in response to a web access request received from first client device 20 for accessing the specific webpage, server computer 10 transmits (320) the specific webpage that includes the customized content to first client device. In some embodiments, server computer 10 also receives first webpage log data from first client device 20 and stores the first webpage log data in its memory.

In some embodiments, the geolocation data and webpage log data for first client device 20 or second client device 30 are updated and stored in the memory of server computer 10, when server computer 10 receives a web access request from the corresponding client device. However, in some embodiments, the geolocation data and webpage log data for each of the first and second client devices are received and updated regularly from the respective client device, independently of receiving the web access request. The respective geolocation data include current geolocation data and historical geolocation data that identify the current and previous locations of the corresponding client device, respectively. Additionally, the webpage log data for the respective client device track information concerning a plurality of websites that have been accessed by the respective client device. In some implementations, the webpage log data for the respective client device further includes information about corresponding behavior patterns and interests of a user of the respective client device, which are derived based on the specific websites that are accessed by the user.

More details on the geolocation data and the webpage log data for each client device are explained above with reference to FIGS. 1, 2A and 2B. In addition, a predetermined range with regard to the first geolocation of first client device 20 is applied to identify second client devices 30 based on the geolocation data of the first and second client devices, and more details on the predetermined range are also explained above with reference to FIGS. 1, 2A and 2B.

Under many circumstances, the customized content of the requested webpage is selected from images, product information, sales, sales tips, news posts, stock quotes, and advertisements. For corresponding examples, see FIGS. 2A and 2B and the description above of these figures. In another specific example, the specific webpage includes a list of search results in response to the web access request that identifies search criteria, and the list of search results are determined according to the webpage log data from second client devices 30 that are located within the predetermined range of the first client device.

It is noted that in method 300, the webpage log data for second client devices 30 is preferably retained at server computer 10 without being transmitted together with the specific webpage to first client device 20. Therefore, under many circumstances, the customized content of the specific webpage is determined at server computer 10 without sharing the webpage log data with other client devices or compromising privacy of second client devices 30.

It should be understood that the particular order in which the operations in FIG. 3 have been described are merely exemplary and are not intended to indicate that the described order is the only order in which the operations could be performed. One of ordinary skill in the art would recognize various ways to pushing webpage content based on device locations as described herein. Additionally, it should be noted that details of other processes described herein with respect to methods 200, 250, 400 and 500 (e.g., FIGS. 2A, 2B, 4 and 5) are also applicable in an analogous manner to method 300 described above with respect to FIG. 3. For brevity, these details are not repeated here.

Figure 4:
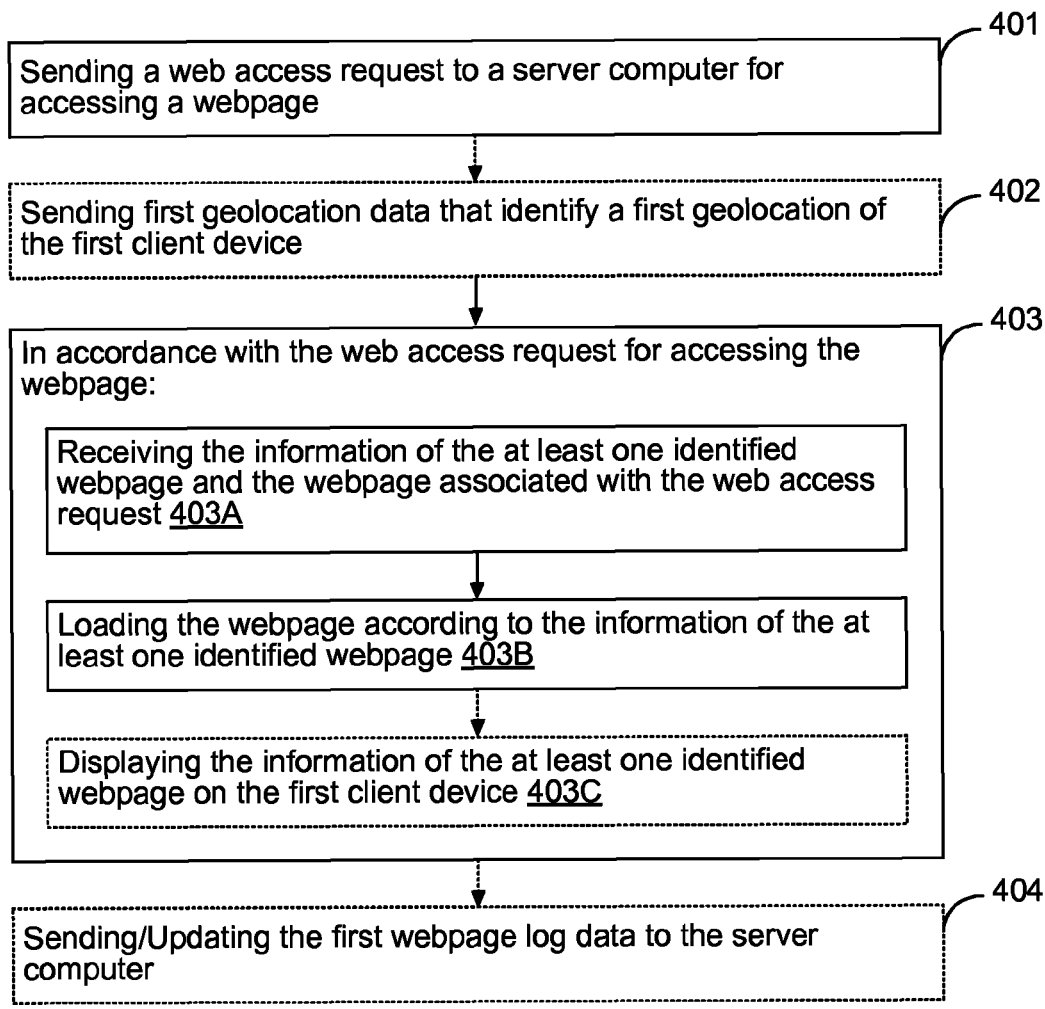
FIG. 4 illustrates a flow chart for an exemplary method that is implemented at a client device to process location based data according to some embodiments in the invention.

FIG. 4 illustrates a flow chart for an exemplary method that is implemented at a client device to process location based data according to some embodiments in the invention. In some specific implementations, the location based data are associated with content of a specific webpage that is requested by the client device (e.g., first client device 20 as illustrated in FIG. 1). Method 400 is, optionally, governed by instructions that are stored in a non-transitory computer readable storage medium and that are executed by one or more processors of a client device. Each of the operations shown in FIG. 4 may correspond to programs or instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 400 may be combined and/or the order of some operations may be changed.

In some embodiments, first client device 20 sends (401) a web access request to server computer 10 to request access to a webpage. In accordance with (403) the web access request for accessing the webpage, first client device 20 receives (403A) from server computer 10 information of at least one identified webpage and the webpage associated with the web access request. The at least one identified webpage is associated with at least one second client device 30 that has been determined by server computer 10 as a device currently or previously located with a predetermined range of the first geolocation of first client device 20. For brevity, the details are not repeated here with respect to corresponding operations to identify the at least one identified webpage in the webpage log data for second client devices 30 at server computer 10. Subsequently after receiving the information of the at least one identified webpage and the requested webpage, first client device 20 loads (403B) the requested webpage according to the information of the at least one identified webpage. In some implementations, content of the requested webpage is customized based on the information of the at least one identified webpage, before the webpage is loaded at first client device 20.

In some embodiments, first client device 20 further displays (403C) the information of the at least one identified webpage on first client device 20. In one example, the at least one identified webpage includes multiple web pages, and such information is displayed in a format of list or table to facilitate further research by the user of first client device 20. Optionally, the user of first client device 20 sets display parameters, e.g., number of web pages displayed on one screen, on a certain user interface. Optionally, the user selects a display format as successive pages or drop-down menus.

Alternatively, in some implementations not reflected in FIG. 4, in accordance with the web access request, first client device 20 receives (403A) the requested webpage that includes customized content from server computer 10, and the information of the at least one identified webpage is retained at server computer while content customization of the requested webpage is completed on server computer 10. After receiving the requested web page, first client device 20 again loads (403B) the webpage including the customized content.

As explained above, first client device 20 may be a fixed client device (e.g., a desktop computer) or a mobile client device (e.g., a notebook computer, a mobile phone and a tablet personal computer). In some embodiments, first client device 20 determines its own geolocation (e.g., first geolocation), and sends (402) corresponding first geolocation data to server computer 10. In this circumstance, first client device 20 applies its embedded LBS function or specifically a GPS function to determine the first geolocation data of first client device 20, and reports such first geolocation data to server computer 10. In some embodiments, the first geolocation data of first client device 20 are optionally determined according to an IP address of first client device by server computer 10.

Method 400 further includes (404) sending and/or updating first webpage log data to server computer 10. In some embodiments, the first geolocation data are regularly sent and updated to server computer 10, and however, in other embodiments, the first geolocation data are updated together with the web access request, when the web access request is sent to server computer 10. More details on the format of the first geolocation data are explained above with reference to FIGS. 1, 2A and 2B.

Under many circumstances, first client device 20 retains webpage log data (e.g., first webpage log data) that track a plurality of websites that have been accessed by itself during a certain duration of time. Optionally, first client device 20 regularly updates the first webpage log data to server computer 10. In some implementations, the first webpage log data are sent and updated to server computer 10 after receiving and loading the requested webpage in accordance with the web access request.

In some implementations, client device 20 maintains a user interface (e.g., a tool menu) as a part of a web browser to control the above location based data pushing operations. In some embodiments, sending the webpage access request further includes enabling a control option for location based data pushing on the user interface of the web browser. In accordance with the enabled control option, the user interface included in the web browser allows first client device 20 to utilize the webpage log data concerning the web pages that are accessed by second client devices 30 located nearby within a predetermined range.

In some implementations, the user of first client device 20 enables the control option via a designated action of the user, and the designated action includes, but is not limited to, a click on a mouse button, a slide on a touch pad, and the like. As a specific example, two options are set forth in the user interface of the web browser. One option is controlled to access first webpage log data that are created and maintained locally by first client device 20, and the other option is controlled to access the webpage log data for second client devices 30 that are currently or were previously located nearby within the predetermined range of a selected first geolocation. On the same user interface, the user of first client device 20 is allowed to define criteria to select the first geolocation and the predetermined range around first client device 20.

When the user of first client device 20 selects the option for accessing the first webpage log data, the user may view a record of web pages that have been browsed locally during a predetermined period of time. When the user of first client device 20 selects the other option for accessing the webpage log data for second client device 30, first client device 20 executes programs to implement the aforementioned methods (e.g., methods 200 and 250), allowing the user to review a record of web pages that have been browsed by user(s) of second client devices 30.

In addition to such optional proactive reviewing of the webpage log data for the first and second client devices, the user is also provided with a requested webpage including customized content that reflects the webpage log data from both first and second client devices. Thus, such sharing of the webpage log data among first and second client devices allows the scope for the content of the pushed webpage to be expanded based on browsing activities of their users who may share similar background and interests, such that the user of a client device may be provided with more relevant content and enjoy improved user experience. More details on improving the user experiences based on location based data pushing are explained above with reference to FIGS. 1-3. For brevity, these details are not repeated here.

It should be understood that the particular order in which the operations in FIG. 4 have been described are merely exemplary and are not intended to indicate that the described order is the only order in which the operations could be performed. One of ordinary skill in the art would recognize various ways to receive location based data as described herein. Additionally, it should be noted that details of other processes described herein with respect to methods 200, 250, 300 and 500 (e.g., FIGS. 2A, 2B, 3 and 5) are also applicable in an analogous manner to method 400 described above with respect to FIG. 4. For brevity, these details are not repeated here.

Figure 5:
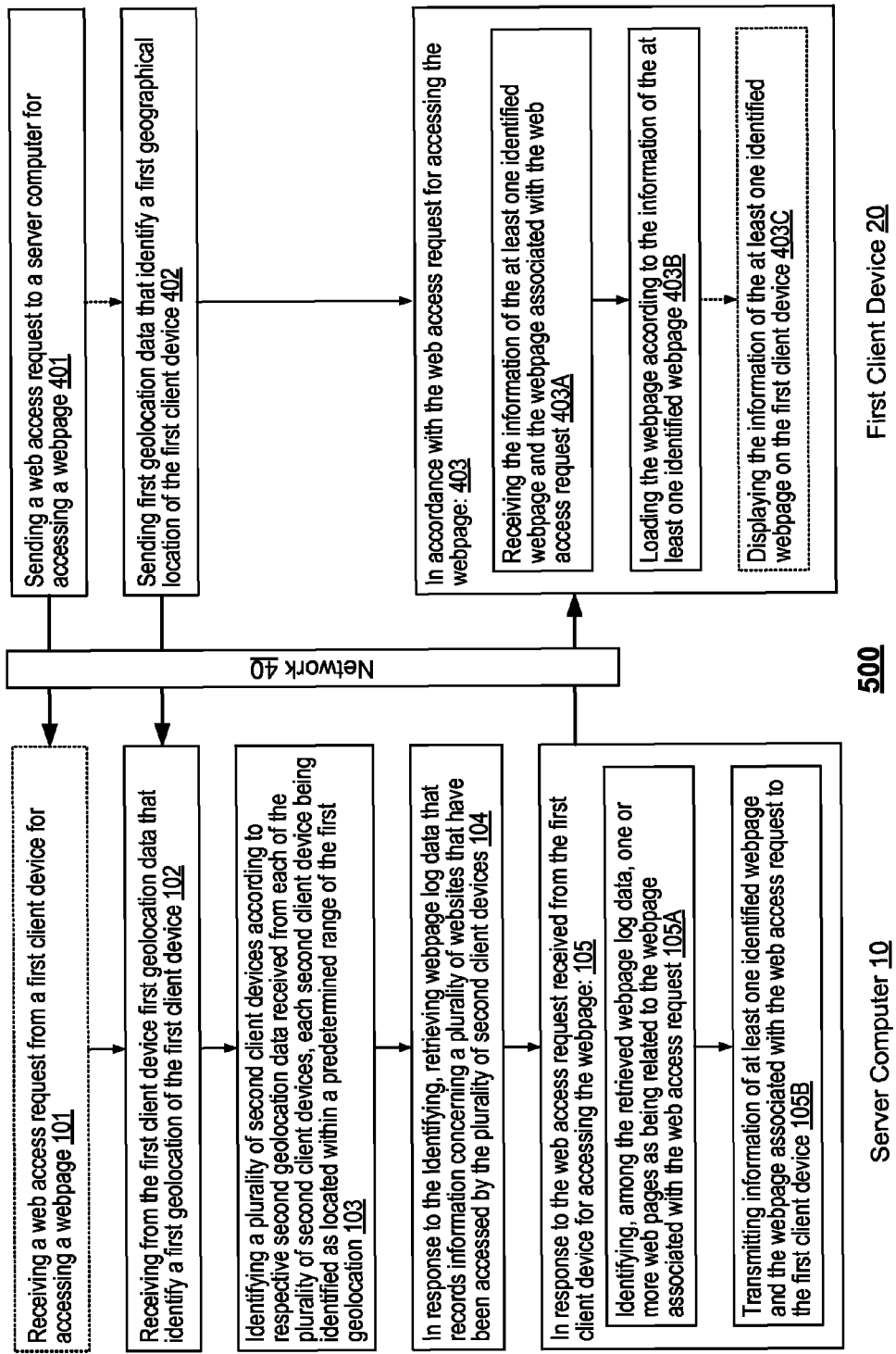
FIG. 5 illustrates a comprehensive flow chart for an exemplary location based data pushing method that is implemented between a server computer and a client device to process a web access and corresponding location based data according to some embodiments in the invention.

FIG. 5 illustrates a comprehensive flow chart for an exemplary location based data pushing method 500 that is implemented between a server computer and a client device to process a web access request and corresponding location based data according to some embodiments in the invention. Method 500 optionally combines method 400 that is implemented at a client device (e.g., first client device 20) with one of methods 200, 250 and 300 that is implemented at a server computer (e.g., server computer 10). Method 500 allows first client device 20 to include in a requested webpage customized content that is determined according to web pages accessed by one or more associated client devices.

In some implementations, first client device 20 sends (401) a web access request to request access to a webpage, and server computer then receives (101) the web access request. Likewise, first client device 20 sends (402) first geolocation data that identify at least a first geolocation of first client device, and server computer then receives (102) the first geolocation data for identifying the first geolocation. Server computer 10 further identifies (103) a plurality of second client devices according to respective second geolocation data received from each of the plurality of second client devices. Each identified second client device 30 is identified as previously or current located within a predetermined range of the first geolocation of first client device 20. In response to the identifying (103), server computer 10 further retrieves (104) webpage log data that records information concerning a plurality of websites that have been accessed by second client devices 30. Server computer 10 then responds (105) to the web access request received from first client device 20 by identifying (105A), among the retrieved webpage log data, one or more web pages as being related to the webpage associated with the web access request; and transmitting (105B) information of at least one identified webpage and the webpage associated with the web access request to the first client device. On the other hand, in accordance with the web access request for accessing the webpage, first client device 20 receives (403A) from server computer 10 the information of at least one identified webpage and the webpage associated with the web access request.

As explained above with reference to FIG. 1, the first geolocation data identify a current location or a plurality of previous locations where first client device 20 is or was located, respectively; the second geolocation data similarly identify a current location or a plurality of previous locations where second client devices 30 are or were located, respectively. Therefore, in methods 200-500, second client devices 30 are determined according to the first geolocation and the predetermined range, and thus, identified under one of the following four situations: when they are presently located within the predetermined range of the current location of first client device 20, when they were previously located within the predetermined range of the current location of first client device 20, whey are currently located within the predetermined range of a previous location that first client device 20 once visited, and when they were previously located within the predetermined range of a previous location that first client device 20 once visited. Stated another way, first client device 20 and second client devices 30 share some common activity regions. In some implementations, first client device 20 incorporates a user interface on a web browser to allow the user to determine criteria of identifying second client devices 30, e.g., the predetermined range, the first geolocation and one of the four situations.

It should be understood that the particular order in which the operations in FIG. 2A have been described are merely exemplary and are not intended to indicate that the described order is the only order in which the operations could be performed. One of ordinary skill in the art would recognize various ways to push data and webpage content as described herein. Additionally, it should be noted that details of other processes described herein with respect to methods 200,

250, 300 and 400 (e.g., FIGS. 2A, 2B, 3 and 4) are also applicable in an analogous manner to method 200 described above with respect to FIG. 5. For brevity, these details are not repeated here.

Figure 6:
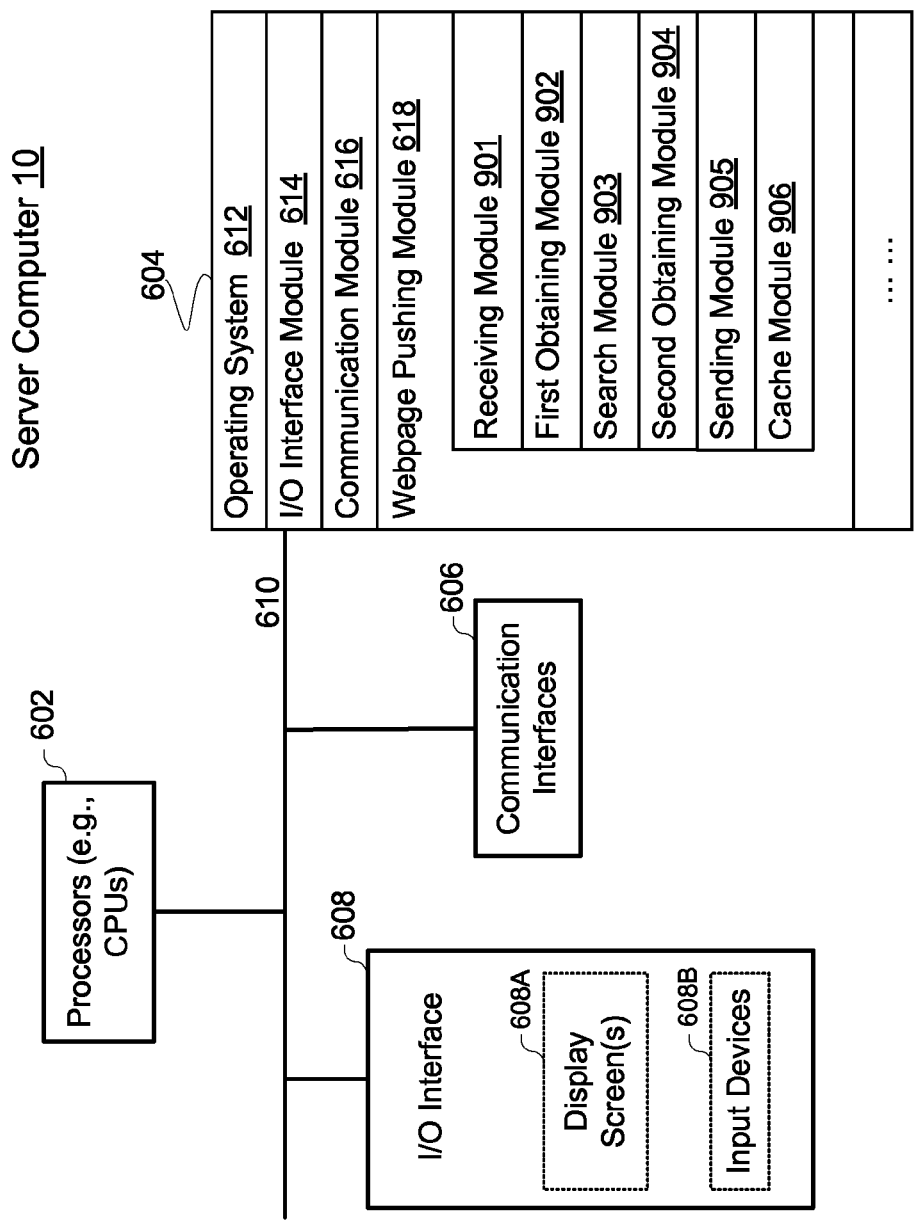
FIG. 6 illustrates a block diagram of an exemplary server computer that is used for pushing location based data according to some embodiments in the invention.

FIG. 6 illustrates a block diagram of an exemplary server computer that is used for pushing location based data according to some embodiments in the invention. In accordance with various embodiments of the invention, server computer 10 is applied to implement location based data pushing methods as shown in FIGS. 1-5. In some implementations, server computer 10 at least includes one or more processors 602 (e.g., central processing units) and a memory 604 for storing programs and instructions for execution by one or more processors 602. In some implementations, server computer 10 further includes one or more communications interfaces 606, a user interface 608, and one or more communications buses 610 that interconnect these components.

In some embodiments, input/output (I/O) interface 608 includes a display 608A and input devices 608B such as a keyboard, a mouse or a track-pad. In some embodiments, communication buses 610 include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604 includes one or more storage devices remotely located from the one or more processors 602. In some embodiments, memory 604, or alternatively the non-volatile memory device(s) within memory 604, includes a non-transitory computer readable storage medium.

In some embodiments, memory 604 or alternatively the non-transitory computer readable storage medium of memory 604 stores the following programs, modules and data structures, instructions, or a subset thereof:

Operating System 612 that includes procedures for handling various basic system services and for performing hardware dependent tasks;

I/O interface module 614 that includes procedures for handling various basic input and output functions through one or more input and output devices;

Communication module 616 that is used for connecting server computer 10 to other server computer 10 or client devices 20, via one or more network communication interfaces 606 (wired or wireless) and one or more communication networks, such as the Internet, other wide area networks, local area networks, metropolitan area networks, and so on; and Webpage pushing module 618 that responds to a web access request from first client device 20 by providing a corresponding requested webpage together with information of at least one webpage accessed by other related client devices, or by providing the corresponding requested webpage that already incorporates content customized based on the information of the at least one webpage.

In some implementations, webpage pushing module 618 in memory 604 further includes:

receiving module 901 that receives the web access request sent by first client device 20;

first obtaining module 902 that obtains first geolocation data for identifying a first geolocation of first client device 20;

search module 903 that identifies a plurality of second client devices 30 previously or currently located within a predetermined range of the first geolocation of first client device 20, in accordance with first geolocation data and respective geolocation data received from each of the plurality of second client device;

second obtaining module 904 that obtains and stores webpage log data that records information concerning a plurality of websites that have been accessed by the plurality of second client devices 30;

sending module 905 that identifies among the webpage log data one or more web pages as being related to a requested webpage and transmits information of at least one identified webpage and the requested webpage to first client device 20; and cache module 906 that manages and handles storing of the respective geolocation data and the respective webpage log data for the first and second client devices.

As explained above with reference to FIGS. 1-5, in some implementations, server computer 10 regularly receives updates of the geolocation data and the webpage log data for both the first and second client devices. These data are optionally updated upon receiving a web access request from a client device. As such, the latest geolocation data are regarded as indicating the current geolocation of the corresponding client device, even though the client device might have moved to a distinct location since the last update. In general, second client devices 30 are determined when they have previously visited or are currently located within the predetermined range of a reference geolocation (e.g., the first geolocation) that first client device 20 previously visited or is currently located at, and such determination is independent of whether the first and second client devices have even contemporaneously stayed nearby the same geolocation. For brevity, details concerning identifying second client devices based on the first and second geolocation data are not repeated here.

Figure 7:
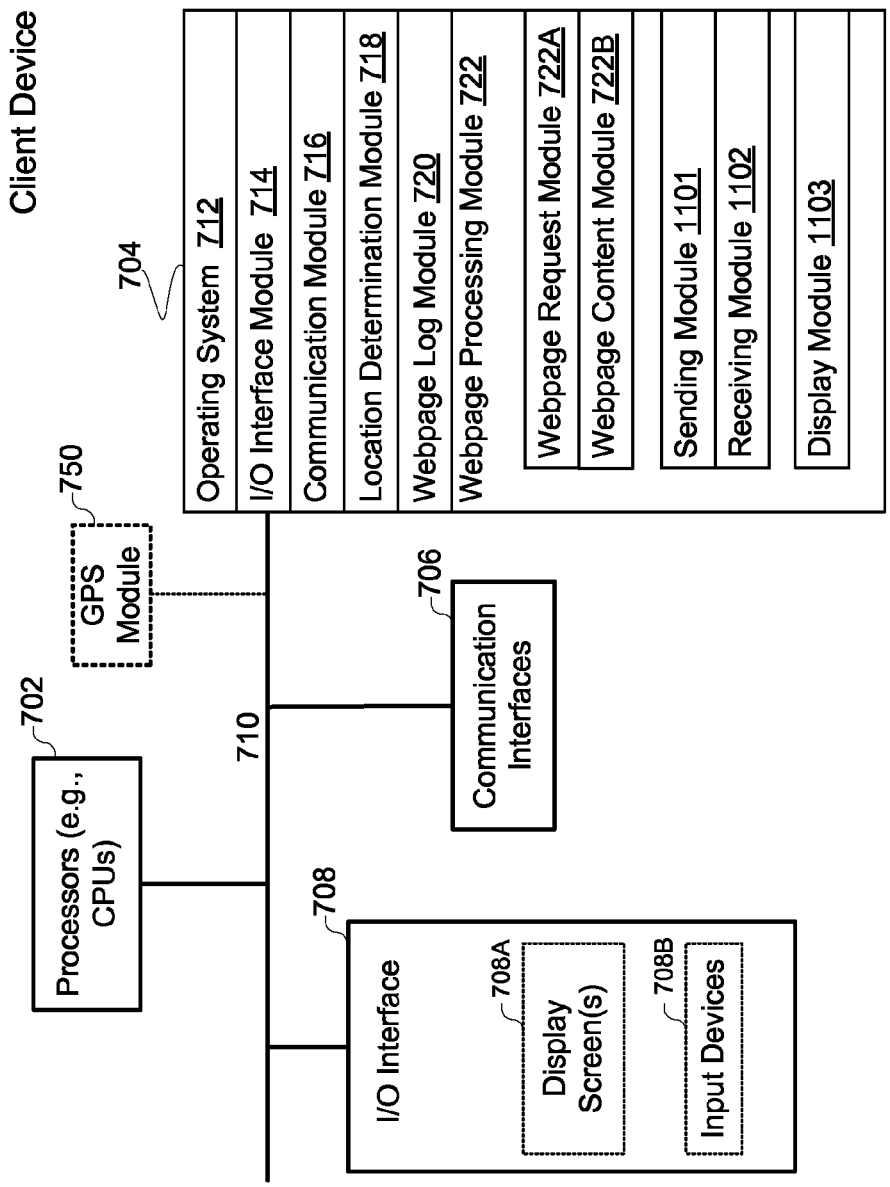
FIG. 7 illustrates a block diagram of an exemplary client device that is used for accessing a webpage based on its geolocation according to some embodiments in the invention.

FIG. 7 illustrates a block diagram of an exemplary client device 700 that is used for accessing a webpage based on its geolocation according to some embodiments in the invention. In accordance with various embodiments of the invention, client 700 optionally represents each of first client device 20 or second client devices 30 that are applied to implement location based data pushing methods as shown in FIGS. 1-5. In some implementations, client device 700 at least includes one or more processors 702 (e.g., central processing units) and a memory 704 for storing programs and instructions for execution by one or more processors 702. In some implementations, client device 700 further includes one or more communications interfaces 706, a user interface 708, and one or more communications buses 710 that interconnect these components.

In some embodiments, I/O interface 708 includes a display 708A and input devices 708B such as a keyboard, a mouse or a track-pad. In some embodiments, communication buses 710 include circuitry (sometimes called a chipset) that interconnects and controls communications between system components. In some embodiments, memory 704 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 704 includes one or more storage devices remotely located from the one or more processors 702. In some embodiments, memory 704, or alternatively the non-volatile memory device(s) within memory 704, includes a non-transitory computer readable storage medium.

In some embodiments, memory 704 or alternatively the non-transitory computer readable storage medium of memory 704 stores the following programs, modules and data structures, instructions, or a subset thereof:

- Operating System 712 that includes procedures for handling various basic system services and for performing hardware dependent tasks;
- I/O interface module 714 that includes procedures for handling various basic input and output functions through one or more input and output devices;
- Communication module 716 that is used for connecting client device 700 to server computer 10 or other client devices, via one or more network communication interfaces 706 (wired or wireless) and one or more communication networks, such as the Internet, other wide area networks, local area networks, metropolitan area networks, and so on;
- LBS module 718 that generates geolocation data for identifying a geolocation for client device 700, wherein the geolocation optionally includes a current location where client device 700 is currently located or a previous location where client device 700 was previously located;
- Webpage log module 720 that generates first webpage log data for tracking a plurality of web pages currently or previously visited by client device 700; and
- Webpage processing module 722 that issues a web access request, receives and processes a requested webpage from server computer 10, and presents the requested webpage to a user of client device 700, wherein in some implementations, webpage processing module 722 in first client device 20 optionally receives information of web pages associated with second client devices 30 and processes the requested webpage accordingly.

In some implementations which involves client device 20, webpage processing module 722 in memory 704 further includes:

- sending module 1101 that sends a web access request to server computer 10 and the first geolocation data of first client device 20 to server computer 10; and
- receiving module 1102 that receives information of at least one identified webpage in the webpage log data of second client devices 30 and the requested webpage associated with the web access request, or receives a specific requested webpage that already includes content customized according to the webpage log data of second client devices 30;
- a display module 1103 that displays to the user of first client device 20 information of at least one identified webpage in the webpage log data of second client devices 30;
- a webpage request module 722A that generates the web access request to request access to the webpage, and allows the user to adjust control options on a user interface of a web browser and enable pushing of location based webpage content; and
- a webpage content module 722B that locally processes the requested webpage to customize its content according to the received information of the at least one identified webpage in the webpage log data of second client devices 30.

In some implementations, first client device 20 further includes a user interface in a web browser. A user of first client device 20 determines via the user interface one or more settings in a setting group that consists of a respective duration of time for which the geolocation data and the webpage log data are maintained, a respective frequency for which such data are updated with server computer 10, a control option that enables or disables the corresponding location based data pushing function, first criteria for selecting a reference geolocation (e.g., the first geolocation) based on the first webpage log data, a predetermined range with respect to the reference geolocation for identifying second client devices 30, and second criteria for selecting second client devices 30 that are currently or were previously located near the reference location. More details for each setting in the setting group are explained above with reference to FIGS. 1-5. For brevity, these details are not repeated here.

Similarly, in some implementations, each second client device 30 also includes a respective user interface that allows a user to determine via the user interface one or more settings in a web browser. The corresponding setting group optionally includes a duration of time for which the webpage log data are maintained and a frequency for which such data are updated with server computer 10. However, the other settings associated with location based data pushing are optionally included in accordance with whether such a function is supported by the web browser of respective second client device 30.

In summary, a location based data push method (e.g., methods 200, 250, 300, 400 and 500) allows client device 700 to obtain a webpage whose content is customized according to web pages browsed on other client devices that were or are located within the predetermined range of the reference location. Such an implementation is based on an assumption that users of client devices share at least some behaviors, habits, interests or tastes when their physical activity space overlaps in their actual life. Given such an assumption, the requested webpage is customized to predict needs of the users of the client devices according to the web pages accessed by other related users, such that more relevant webpage content is offered to improve their user experience.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for location-based data pushing, comprising:
    at a server computer having one or more processors and memory for storing programs to be executed by the one or more processors:
    receiving from a first client device first geolocation data that identify a first geographical location (geolocation) of the first client device;
    identifying a plurality of second client devices according to respective geolocation data received from each of the plurality of second client devices, each second client device being identified as located within a predetermined range of the first geolocation;
    in response to the identifying, retrieving webpage log data that record browsing activities of users of the plurality of second client devices, the webpage log data including information concerning content of a plurality of websites that have been accessed by the plurality of second client devices; and
    in response to a web access request received from the first client device for accessing a webpage:
        identifying, among the retrieved webpage log data, one or more web pages as being related to the webpage associated with the web access request, including: determining that content of the one or more web pages is related to a common browsing interest of users of the first client device and the plurality of second client devices; and
        transmitting information of at least one of the identified web pages and the webpage associated with the web access request to the first client device, thereby providing the content of the one or more web pages to the first client device as relevant content and expanding a scope of the requested webpage with the content of the one or more web pages.

2. The method of claim 1, wherein the webpage log data for the plurality of second client devices were previously stored in the memory of the server computer, when the server computer received respective web access requests issued by the plurality of second client devices.

3. The method of claim 1, wherein first webpage log data are received from the first client device when the first geolocation data are received from the first client device, such that the first webpage log data may be transmitted to and used by another client device.

4. The method of claim 1, wherein the respective geolocation data received from each of the first client device and the plurality of second client devices further comprise current geolocation data that identify where the respective client device is currently located, and historical geolocation data that identify where the respective client device was previously located during a predetermined duration of time.

5. The method of claim 1, wherein the webpage log data for the plurality of second client devices include URL addresses and information concerning content of the plurality of websites that have been accessed by the plurality of second client devices during a predetermined duration of time.

6. The method of claim 1, wherein the content of the webpage associated with the web access request is customized according to behaviors of respective users of the plurality of second client devices, and the behaviors of the users are derived from content for the one or more web pages accessed by the respective second client device and recorded in the webpage log data of the plurality of second client devices.

7. The method of claim 6, wherein the customized content of the webpage associated with the web access request are selected from images, product information, sales tips, news posts, stock quotes, and advertisements.

8. The method of claim 1, wherein the server computer tracks and updates the first geolocation data, the respective geolocation data received from each of the plurality of second client devices, and the webpage log data before the first client device sends the web access request.

9. The method of claim 1, wherein a user of the first client device enables and disables the method for location-based data pushing by controlling an option on a user interface of the first client device.

10. The method of claim 1, wherein the predetermined range of the first client device substantially covers a venue where the user of the first client device is currently or was previously located, and the venue is selected from a group consisting of a school, a store, a company site, a library, a hotel and a residence.

11. A server computer, comprising:
    one or more processors; and
    memory having instructions stored thereon, wherein the instructions, when executed by the one or more processors cause the processors to perform operations including:
        receiving from a first client device first geolocation data that identify a first geographical location (geolocation) of the first client device;
        identifying a plurality of second client devices according to respective second geolocation data received from each of the plurality of second client devices, each second client device being identified as located within a predetermined range of the first geolocation;

in response to the identifying, retrieving webpage log data that records information concerning a plurality of websites that have been accessed by the plurality of second client devices; and in response to a web access request received from the first client device for accessing a webpage:

identifying, among the retrieved webpage log data, one or more web pages as being related to the webpage associated with the web access request, including: determining that content of the one or more web pages is related to a common browsing interest of users of the first client device and the plurality of second client devices; and transmitting information of at least one of the identified webpages and the webpage associated with the web access request to the first client device, thereby providing the content of the one or more web pages to the first client device as relevant content and expanding a scope of the requested webpage with the content of the one or more web pages.

12. The server computer of claim 11, wherein the content of the webpage associated with the web access request is customized according to behaviors of respective users of the plurality of second client devices, and the behaviors of the respective users are derived from content for the one or more web pages accessed by the respective second client device and recorded in the webpage log data of the plurality of second client devices.

13. The server computer of claim 12, wherein the customized content of the webpage associated with the web access request are selected from images, product information, sales tips, news posts, stock quotes, and advertisements.

14. A method for location-based data pushing, comprising:

at a server computer having one or more processors and memory for storing programs to be executed by the one or more processors:

receiving from a first client device first geolocation data that identify a first geographical location (geolocation) of the first client device;

identifying a plurality of second client devices according to respective second geolocation data received from each of the plurality of second client devices, each second client device being identified as located within a predetermined range of the first geolocation;

in response to the identifying, retrieving webpage log data that records browsing activities of users of the plurality of second client devices, the webpage log data including information concerning a plurality of websites that have been accessed by the plurality of second client devices; and customizing content of a specific webpage according to one or more web pages that are related to the specific webpage and included in the retrieved webpage log data; and in response to a web access request received from the first client device for accessing a webpage, transmitting the specific webpage that includes the customized content to the first client device.

15. The method of claim 14, wherein the specific webpage includes a list of search results in response to the web access request that identifies search criteria, and wherein the list of search results are determined according to the webpage log data from the plurality of second client devices that are located within the predetermined range of the first client device.

16. The method of claim 14, wherein the predetermined range of the first client device substantially covers a venue where the user of the first client device is currently located, and the venue is selected from a group consisting of a school, a store, a company site, a library, a hotel and a residence.

17. The method of claim 14, wherein the webpage log data for the plurality of second client devices were previously stored in the memory of the server computer, when the server computer received respective web access requests issued by the plurality of second client devices.

18. The method of claim 14, the respective geolocation data received from each of the first client device and the plurality of second client devices further comprise current geolocation data that identify where the respective client device is currently located, and historical geolocation data that identify where the respective client device was previously located during a predetermined duration of time.

19. The method of claim 14, wherein the webpage log data for the plurality of second client devices include URL addresses and content for the plurality of websites that have been accessed by the plurality of second client devices during a predetermined duration of time.

* * * * *